(12) United States Patent
Keller et al.

(10) Patent No.: US 10,382,701 B2
(45) Date of Patent: Aug. 13, 2019

(54) ACTIVE IMAGING SYSTEMS AND METHOD

(71) Applicant: RAYTHEON COMPANY, Waltham, MA (US)

(72) Inventors: Sean D. Keller, Tucson, AZ (US); Gerald P. Uyeno, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 9 days.

(21) Appl. No.: 15/345,961

(22) Filed: Nov. 8, 2016

(65) Prior Publication Data

US 2017/0214839 A1 Jul. 27, 2017

Related U.S. Application Data

(63) Continuation-in-part of application No. 15/008,006, filed on Jan. 27, 2016.

(51) Int. Cl.
*H04N 5/235* (2006.01)
*G02B 6/08* (2006.01)
(Continued)

(52) U.S. Cl.
CPC ......... *H04N 5/2354* (2013.01); *G01S 7/4816* (2013.01); *G01S 7/4817* (2013.01);
(Continued)

(58) Field of Classification Search
CPC .. H04N 5/2354; H04N 5/2254; H04N 5/2256; H04N 5/33; G02B 3/0056; G02B 6/08
(Continued)

(56) References Cited

U.S. PATENT DOCUMENTS

| 4,625,108 A | 11/1986 | Nestel et al. |
| 4,653,905 A | 3/1987 | Farrar et al. |

(Continued)

FOREIGN PATENT DOCUMENTS

WO 2014200581 A2 12/2014

OTHER PUBLICATIONS

Santiago, et al., "Adaptive Polymer Lens for Rapid Zoom Shortwave Infrared Imaging Applications", Optical Engineering, SPIE Digital Library, Dec. 15, 2015, pp. 1-5.

(Continued)

*Primary Examiner* — Sinh Tran
*Assistant Examiner* — Zhenzhen Wu
(74) *Attorney, Agent, or Firm* — Lando & Anastasi, LLP (57) ABSTRACT

Imaging systems and method of optical imaging. One example of an imaging system includes an optical scanning subsystem including an optical source and a waveguide, the waveguide being configured to direct optical radiation generated by the optical source over an area of a scene, a detection subsystem including an optical sensor configured to collect reflected optical radiation from the area of the scene, and a fused fiber focusing assembly including a fused fiber bundle, a plurality of lenses coupled together and positioned to receive and focus the reflected optical radiation from the area of the scene directly onto the fused fiber bundle, a microlens array interposed between the fused fiber bundle and the optical sensor and positioned to receive the reflected optical radiation from the fused fiber bundle, and a focusing lens positioned to direct the reflected optical radiation from the microlens array onto the optical sensor.

20 Claims, 4 Drawing Sheets

(51) Int. Cl.

| | | |
|---|---|---|
| *G02F 1/13* | (2006.01) | |
| *G02B 3/00* | (2006.01) | |
| *H04N 5/225* | (2006.01) | |
| *H04N 5/33* | (2006.01) | |
| *H04N 5/232* | (2006.01) | |
| *H04N 5/345* | (2011.01) | |
| *G01S 17/42* | (2006.01) | |
| *G01S 17/89* | (2006.01) | |
| *G01S 7/481* | (2006.01) | |

(52) U.S. Cl.
CPC ............ *G01S 7/4818* (2013.01); *G01S 17/42* (2013.01); *G01S 17/89* (2013.01); *G02B 3/0056* (2013.01); *G02B 6/08* (2013.01); *G02F 1/1326* (2013.01); *H04N 5/2256* (2013.01); *H04N 5/232* (2013.01); *H04N 5/23241* (2013.01); *H04N 5/23296* (2013.01); *H04N 5/33* (2013.01); *H04N 5/345* (2013.01)

(58) Field of Classification Search
USPC ...................................... 348/240.3, 340, 335
See application file for complete search history.

(56) References Cited

U.S. PATENT DOCUMENTS

| | | | |
|---|---|---|---|
| 4,810,088 A | 3/1989 | Karning et al. | |
| 4,965,453 A | 10/1990 | Hoschette et al. | |
| 5,005,979 A | 4/1991 | Sontag et al. | |
| 5,438,873 A | 8/1995 | Wlodarczyk et al. | |
| 6,163,372 A | 12/2000 | Sallee et al. | |
| 6,175,383 B1 | 1/2001 | Yadid-Pecht et al. | |
| 6,215,593 B1 | 4/2001 | Bruce | |
| 6,507,685 B1* | 1/2003 | Polynkin | G01J 3/2803 385/15 |
| 6,943,873 B2 | 9/2005 | Sallee | |
| 6,950,570 B1 | 9/2005 | Novotny | |
| 7,376,314 B2 | 5/2008 | Reininger | |
| 7,575,190 B2 | 8/2009 | Sallee | |
| 7,583,364 B1 | 9/2009 | Mayor et al. | |
| 7,626,152 B2 | 12/2009 | King et al. | |
| 7,745,771 B2 | 6/2010 | Troxell et al. | |
| 7,760,334 B1 | 7/2010 | Evans | |
| 7,786,418 B2 | 8/2010 | Taylor et al. | |
| 8,035,822 B2 | 10/2011 | Riza et al. | |
| 8,081,301 B2 | 12/2011 | Stann et al. | |
| 8,237,835 B1 | 8/2012 | Muller | |
| 8,294,879 B2 | 10/2012 | Silny et al. | |
| 8,351,114 B2 | 1/2013 | Nelson et al. | |
| 8,368,792 B2 | 2/2013 | Xu | |
| 8,380,025 B2 | 2/2013 | Anderson et al. | |
| 8,400,619 B1 | 3/2013 | Bachrach et al. | |
| 8,463,080 B1 | 6/2013 | Anderson et al. | |
| 8,488,253 B2 | 7/2013 | Wakazono et al. | |
| 8,817,271 B1 | 8/2014 | Geary | |
| 8,970,740 B2 | 3/2015 | Herman et al. | |
| 8,989,523 B2 | 3/2015 | Anderson et al. | |
| 2002/0113194 A1* | 8/2002 | Hu | H04N 5/37206 250/208.1 |
| 2003/0183746 A1* | 10/2003 | Chen | H01L 27/14678 250/208.1 |
| 2005/0237530 A1 | 10/2005 | Schnittker | |
| 2005/0271325 A1 | 12/2005 | Anderson et al. | |
| 2009/0015658 A1 | 1/2009 | Enstad et al. | |
| 2009/0142066 A1 | 6/2009 | Leclair et al. | |
| 2009/0278932 A1* | 11/2009 | Yi | H04N 5/2259 348/147 |
| 2010/0128221 A1 | 5/2010 | Muller et al. | |
| 2011/0164330 A1 | 7/2011 | Henriksen et al. | |
| 2011/0181767 A1* | 7/2011 | Neutzler | H04N 5/2254 348/340 |
| 2013/0021474 A1 | 1/2013 | Taylor et al. | |
| 2013/0044309 A1 | 2/2013 | Dakin et al. | |
| 2013/0100538 A1 | 4/2013 | Kim | |
| 2013/0301877 A1 | 11/2013 | Ito | |
| 2014/0152793 A1 | 6/2014 | Staker et al. | |
| 2014/0190666 A1* | 7/2014 | Schlie | F41G 11/00 165/104.21 |
| 2015/0185454 A1* | 7/2015 | Kalkbrenner | G02B 21/0032 250/550 |
| 2015/0207990 A1 | 7/2015 | Ford et al. | |
| 2015/0285625 A1 | 10/2015 | Deane | |
| 2016/0006914 A1 | 1/2016 | Neumann | |
| 2016/0182788 A1 | 6/2016 | Wan et al. | |
| 2016/0182892 A1 | 6/2016 | Ko et al. | |
| 2016/0309065 A1 | 10/2016 | Karafin et al. | |
| 2018/0081182 A1* | 3/2018 | Takahashi | G02B 19/00 |

OTHER PUBLICATIONS

Geary, et al., "Dragonfly Directional Sensor", SPIE, Optical Engineering, vol. 52, Feb. 2013, 9 Pages.

Alter, et al., "Introduction to Fiber Optic Imaging", SCHOTT North America, Feb. 2007, 93 Pages.

Ayral et al., "Phase-Conjugate Nd:YAG Laser with Internal Acousto-Optic Beam Steering", Optics Letters, vol. 16, No. 16, Aug. 15, 1991, pp. 1225-1227.

Chiu et al., "Shape-Optimized Electrooptic Beam Scanners: Analysis, Design, and Simulation", IEEE, Journal of Light Wave Technology, vol. 17, No. 1, Jan. 1999, pp. 108-114.

Kim et al., "Wide-Angle, Nonmechanical Beam Steering Using Thin Liquid Crystal Polarization Gratings", Proc. of SPIE, vol. 7093, 2008.

"SEEOR: Evanescently Coupled Non-mechanical Beam Steering", Vescent Photonics, 2015 [retrieved on Sep. 2, 2016], <URL: http://www.vescent.com/wp-content/uploads/2015/04/LS-1uJ7.1.pdf>.

International Search Report and Written Opinion for application No. PCT/US2017/049114 dated Nov. 22, 2017.

Keller et al., "Emerging Liquid Crystal Waveguide Technology for Low SWaP Active Short Wave Infrared Imagers", Proc. of SPIE, vol. 9384, pp. 1-9, 2015.

\* cited by examiner

ACTIVE IMAGING SYSTEMS AND METHOD

CROSS-REFERENCE TO RELATED APPLICATIONS

This application is a continuation in part of and claims priority under 35 U.S.C. § 120 to U.S. application Ser. No. 15/008,006, titled "VARIABLE MAGNIFICATION ACTIVE IMAGING SYSTEM," filed Jan. 27, 2016, which is incorporated herein by reference in its entirety.

BACKGROUND

Typical active optical systems use laser radiation to image a scene and detect objects within that scene. The scene is imaged by sensing reflections of the laser radiation at a detector, which often will include a Focal Plane Array (FPA). FPAs generally include an array of detector elements, or unit cells (i.e., pixels), organized in rows and columns. A circuit within each unit cell of the FPA accumulates charge corresponding to the flux of incident radiation at a photodetector within the unit cell. Typically, the charge within the unit cell is accumulated at a capacitive element which produces a voltage proportional to the accumulated charge. The voltage corresponds to the intensity of the flux over a given time period referred to as the integration period (or integration interval). The resulting voltage is conveyed by additional circuitry to an output of the array, and may be used to generate an image. In some instances, the voltage or charge can be digitized by circuitry of the focal plane array resulting in binary values, at least one value for each unit cell of the focal plane array. Accordingly, some focal plane arrays may be used to convert a two-dimensional pattern of flux into a two-dimensional array of binary values, resulting in a digital image.

SUMMARY OF THE INVENTION

Aspects and embodiments are generally directed to optical systems and methods, and in particular, to optical systems (e.g., imaging systems) and methods which include solid-state active optical elements for improved weight reduction and reduced power consumption for long-range imaging and target tracking. In various aspects and embodiments, the imaging systems discussed herein may include an optical scanning subsystem configured to direct optical radiation over an area of a scene, a fused fiber focusing assembly positioned to collect reflections of the optical radiation from the area of the scene, and a detection subsystem arranged to direct the reflected optical radiation onto an optical sensor. As further discussed below, non-mechanical components of the imaging system, for example the fused fiber focusing assembly, may reduce the weight, size, and power consumption of the system relative to typical active imaging systems. Accordingly, various aspects and embodiments provide an optical system configured to perform rapid imaging scans while maintaining a reduced weight, size, and power consumption imaging system for ground, mobile, maritime, airborne, and space imaging environments.

According to an aspect, provided is an imaging system. In one example, the imaging system comprises an optical scanning subsystem including an optical source and a waveguide, the waveguide being configured to direct optical radiation generated by the optical source over a first area of a scene, a detection subsystem including an optical sensor configured to collect reflected optical radiation from the first area of the scene, and a fused fiber focusing assembly including a fused fiber bundle, a plurality of lenses, the plurality of lenses being coupled together and positioned to receive and focus the reflected optical radiation from the first area of the scene directly onto the fused fiber bundle, a microlens array interposed between the fused fiber bundle and the optical sensor, the microlens array being positioned to receive the reflected optical radiation from the fused fiber bundle, and a focusing lens positioned to direct the reflected optical radiation from the microlens array onto the optical sensor.

In one example, the fused fiber bundle includes a cylindrical fiber taper including a plurality of ordered optical fibers. According to one example, the fused fiber bundle includes a plurality of ordered optical fibers arranged in a rectilinear pattern. In an example, the focusing lens is interposed between the microlens array and the optical sensor. According to an example, the imaging system further comprises a micromirror device positioned between a first lens and a second lens of the plurality of lenses, and at a focal point of the fused fiber focusing assembly.

In one example, the optical sensor includes a single linear array of unit cells, and the waveguide is further configured to direct the optical radiation generated by the optical source in a first fan beam over the first area of the scene. In an example, the waveguide is further configured to direct the optical radiation generated by the optical source in a second fan beam over a second area of the scene, the second area of the scene being different from the first area of the scene. According to an example, the imaging system further comprises a controller coupled to the detection subsystem and the optical scanning subsystem, and the controller is configured to generate a two-dimensional image of the scene based at least in part on the reflected optical radiation from the first area of the scene and reflected optical radiation from the second area of the scene.

According to one example, the optical sensor includes a single unit cell, and the waveguide is further configured to direct the optical radiation generated by the optical source in a spot beam over the first area of the scene. In an example, the optical source includes an active shortwave (SWIR) infrared laser configured to emit SWIR radiation in a wavelength range of approximately 0.9-1.7 micrometers. In one example, the waveguide is a solid-state liquid crystal waveguide.

According to an aspect, provided is a method of optical imaging. In one example, the method comprises the acts of directing optical radiation generated by an optical source of an optical scanning subsystem over a first area of a scene, receiving reflected optical radiation from the first area of the scene at a first lens of a plurality of lenses of a fused fiber focusing assembly, focusing the reflected optical radiation from the first area of the scene, by the plurality of lenses, directly onto a fused fiber bundle, receiving the reflected optical radiation from the fused fiber bundle at a microlens array, and focusing the reflected optical radiation from the microlens array onto an optical sensor.

In one example, the method further comprises propagating the reflected optical radiation along a length of one or more ordered optical fibers of the fused fiber bundle responsive to focusing the reflected optical radiation directly onto the fused fiber bundle. In an example, the method further comprises receiving the reflected optical radiation from the first area of the scene at the focusing from the microlens array, and focusing the reflected optical radiation onto the optical sensor includes focusing the reflected optical radiation onto the optical sensor with a focusing lens.

According to an example, the method further comprises limiting a field angle of the reflected optical radiation received from the first area of the scene at a micromirror device positioned at a focal point of the fused fiber focusing assembly. In an example, directing the optical radiation over the first area of the scene includes directing the optical radiation in a first fan beam. In one example, the method further comprises directing the optical radiation generated by the optical source in a second fan beam over a second area of the scene, the second area of the scene being different from the first area of the scene, and generating a two-dimensional image of the scene based at least in part on the reflected optical radiation from the first area of the scene and reflected optical radiation from the second area of the scene.

In another example, directing the optical radiation over the first area of the scene includes directing the optical radiation in a first spot beam. In an example, the method further comprises generating the optical radiation at the optical source, and generating the optical radiation includes emitting shortwave (SWIR) infrared radiation in a wavelength range of approximately 0.9-1.7 micrometers.

According to an aspect, provided is another imaging system. In one example, the imaging system comprises a fused fiber bundle including a plurality of ordered optical fibers, a plurality of lenses, the plurality of lenses being positioned to receive and focus, directly onto the fused fiber bundle, reflected optical radiation from a fan beam directed over an area of a scene, an optical sensor including a single linear array of unit cells configured to collect the reflected optical radiation, a microlens array interposed between the fused fiber bundle and the optical sensor, the microlens array being positioned to receive the reflected optical radiation from the fused fiber bundle, and a focusing lens interposed between the microlens array and the optical sensor, the focusing lens positioned to direct the reflected optical radiation from the microlens array to the optical sensor.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments relate to optical systems and methods of using the same. In particular, aspects and embodiments are directed to active solid-state optical systems and methods, and more specifically, to an active solid-state imaging system having a reduced size, weight, power consumption, and cost when compared to conventional imaging systems. Embodiments of the optical systems described herein include an optical scanning subsystem configured to direct optical radiation over an area of a scene, a fused fiber focusing assembly positioned to collect reflections of the optical radiation from the area of the scene, and a detection subsystem positioned to receive and integrate the reflected optical radiation. Optical radiation reflected from the area of the scene and received by the detection subsystem may be used to construct an image of the scene and/or view (e.g., track) an object within the scene.

The ability of an imaging system to accurately view a scene is generally dependent on the sensitivity of the detector, and the intensity of the optical radiation emitted by an illumination source. For example, in various conventional approaches to generating an image of a scene, the illumination source is positioned to continuously illuminate the entire scene within a Field of View (FOV) of detector. Such an approach not only consumes a great deal of power when continuously providing the intensity of illumination necessary for high-contrast imaging at long ranges, it makes power management challenging. Conventional solutions to these problems have suggested employing large power optical sources and complicated mechanical zoom assemblies to modify the FOV of the detector, and to achieve the desired performance. Other approaches have suggested positioning beamforming optics on a gimbal system, which would allow mechanical movement of the system to reduce power consumption. However, with these typical solutions the cost and weight of the associated system significantly increases while the speed of the system decreases, making mobile, maritime, airborne, and space applications much less practical.

Accordingly, various implementations of the improved optical system described herein include a non-mechanical beamsteering waveguide configured to steer optical radiation generated by an optical source over a desired area of a scene, and a fused fiber focusing assembly positioned to collect reflections of the steered optical radiation from the scene. In various embodiments, at least the fused fiber focusing assembly and waveguide reduce the size, weight, power consumption, and cost of the optical system when compared to various known approaches. In various embodiments, the fused fiber focusing assembly may include at least one fused fiber bundle configured to collect and focus collected optical radiation to an optical sensor also having a reduced sized. In such an arrangement, the optical sensor may further reduce the size, weight, power consumption, and cost of the system. For instance, the optical sensor may include a single linear array of unit cells, or a single unit cell.

Accordingly, various aspects and embodiments reduce the size, weight, power consumption, and cost of conventional imaging systems which may provide improved functionality for numerous mobile, maritime, airborne, and space applications.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
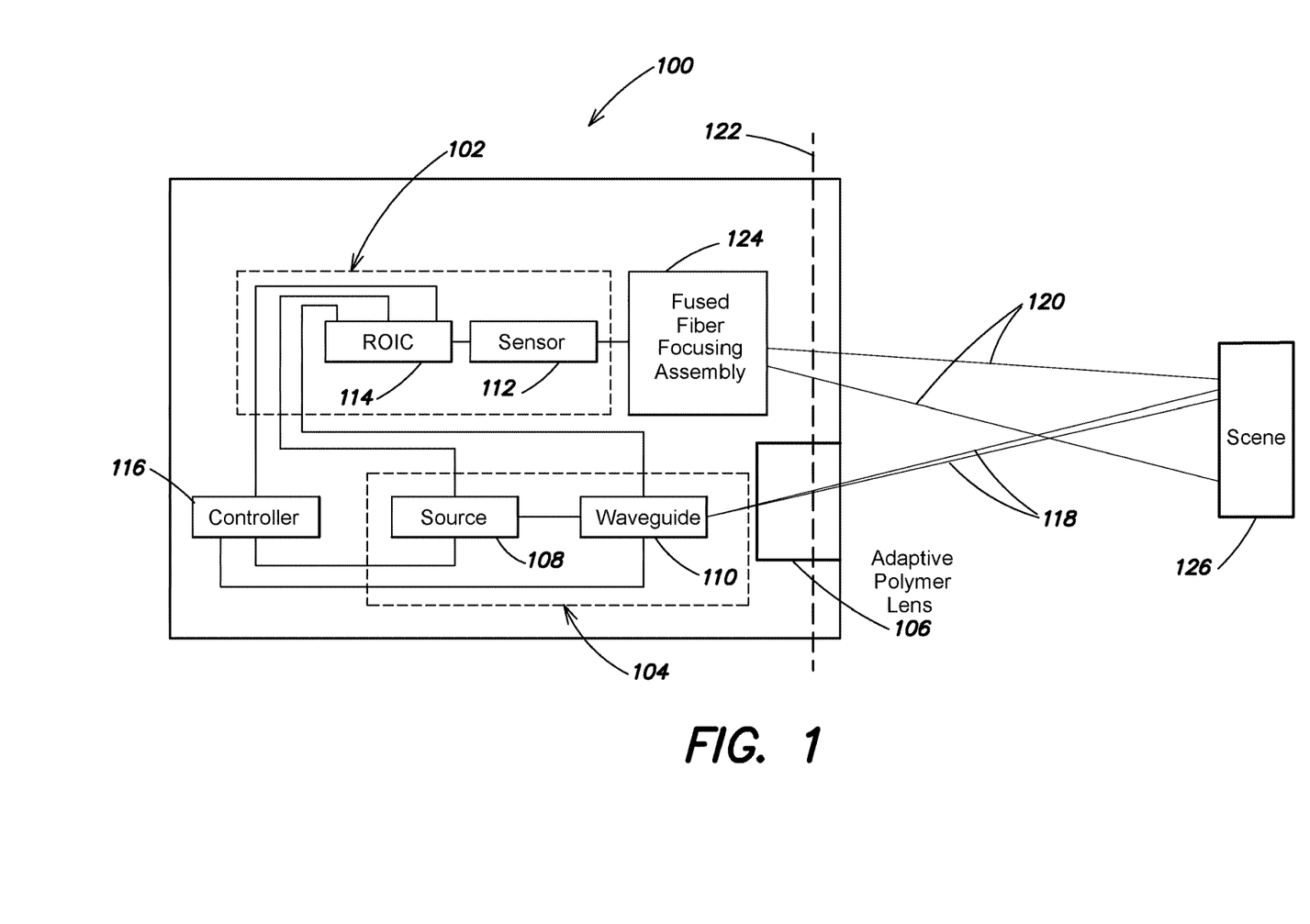
FIG. 1 is a block diagram of an example optical system according to aspects of the invention.

FIG. 1 is a block diagram of an example optical system in accordance with various aspects and embodiments discussed herein. Among other components, the optical system 100 may include a detection subsystem 102, an optical scanning subsystem 104, and a fused fiber focusing assembly 124. As shown in the example of FIG. 1, in certain embodiments the optical system 100 may also include an adaptive polymer lens assembly 106. While shown as being positioned separate from the optical scanning subsystem 104, in various embodiments the adaptive polymer lens assembly 106 may be positioned within the optical scanning subsystem 104 and along an optical axis of the optical scanning subsystem 104. Each of the detection subsystem 102, the fused fiber focusing assembly 124, and the optical scanning subsystem 104 may include various components in optical and/or electrical communication as further discussed herein.

As shown, the optical scanning subsystem 104 may include an optical source 108, and a waveguide 110 coupled to the optical source 108. In various embodiments, the detection subsystem 102 may include at least an optical sensor 112 and a Read-Out Integrated Circuit (ROIC) 114. The ROIC 114 may be coupled directly or indirectly to the optical sensor 112, the optical source 108, and/or the waveguide 110, as shown in FIG. 1. As FIG. 1 also shows, the fused fiber focusing assembly 124 may be coupled to the optical sensor 112. In various further embodiments, the optical system 100 may further include control electronics such as a controller 116 coupled with the ROIC 114, the optical source 108, the waveguide 110, and/or the adaptive polymer lens assembly 106. For instance, in FIG. 1, the controller 116 is shown interposed between the detection subsystem 102 and the optical scanning subsystem 104.

In various embodiments, the optical source 108 is in optical communication with the waveguide 110 and configured to generate and transmit a beam of optical radiation of a predetermined optical wavelength. For example, the optical source may include an active shortwave (SWIR) infrared laser configured to emit SWIR radiation in a wavelength range of approximately 0.9-1.7 micrometers. However, in other examples the optical source 108 may include any other suitable source of optical radiation, such as a NIR (near-infrared) laser source or a visible light source.

As FIG. 1 shows, in certain embodiments the waveguide 110 is positioned to receive the transmitted beam of optical radiation from the optical source 108. For example, the waveguide 110 may receive the transmitted beam of optical radiation via an optical fiber or free space coupling. Responsive to receiving the optical radiation, the waveguide 110 may be controlled to direct the optical radiation generated by the optical source 108 over an area of a scene (e.g., scene 126). This may include directing the optical radiation over a section of the scene that is less than the entire span of the scene. In particular, the waveguide 110 may control the beamsteering of the optical radiation such that the beam of optical radiation is defined by a shape substantially corresponding to the dimensions of the optical sensor. For example, the waveguide 110 may adjust a width of the beam of optical radiation in a direction substantially parallel to a plane at which the scene is positioned.

In FIG. 1, the beam of optical radiation is illustrated by lines 118, and the FOV of the detection subsystem 102 is illustrated by lines 120. As FIG. 1 shows, in certain embodiments the waveguide 110 is configured to direct the optical radiation within a section of a field of view (FOV) of the detection subsystem 102. That is, in various embodiments the illuminated area of the scene may be less than the entire FOV of the detection subsystem 102. As also shown in FIG. 1, in some implementations the FOV of the detection subsystem 102 may not cover the entire span of the scene to be imaged. As discussed in further detail below, the waveguide 110 may be operated to transmit the optical radiation in the direction of the scene as a "fan" beam or a "spot" beam. In one example, a "fan" beam includes a beam of optical radiation having a narrow beam width in one dimension (e.g., a horizontal direction), and a wider beam width in another dimension (e.g., a vertical direction). In contrast, a "spot" beam may include a beam of optical radiation having a concentrated area of substantially uniform shape (e.g., a circular shape).

In various embodiments, the waveguide 110 includes a non-mechanical beamsteering device, such as a solid-state waveguide, and in particular, a solid-state liquid crystal waveguide. For example, the solid-state liquid crystal waveguide may receive the transmitted beam via a fiber coupling from the optical source 108, and continuously scan the radiation over a range of up to 30° by 5°. In one example, the solid-state liquid crystal waveguide includes a Steerable Electro-Evanescent Optical Reflector offered by Vescent Photonics, Inc. of Golden, Colo.

In one embodiment, the waveguide 110 may be coupled and in electrical communication with the ROIC 114 of the detection subsystem 102 and/or the controller 116. For example, the controller 116 of various embodiments may be configured to apply a control voltage (e.g., an analog control voltage) to the waveguide 110 to adjust a refractive index of the waveguide 110, and adjust the beamsteering of the waveguide 110. While described in one example as configured to receive a control voltage from the controller 116, in certain other examples the waveguide 110 may instead include dedicated control circuitry which specifies the beamsteering operations. For instance, the dedicated control circuitry may include application specific integrated circuitry or any combination of various hardware and logic circuitry.

In contrast to conventional beamsteering approaches, which typically require beamforming optics positioned on a pivoted support structure to accurately direct optical radiation, examples of the waveguide 110 discussed herein remove the need for such gimbaled structures. Furthermore, the waveguide 110 may be controlled to direct optical radiation generated by a single optical source (e.g., the optical source 108) over the area of the scene to be imaged. Accordingly, in addition to the various technical advantages discussed above, the waveguide 110 of various aspects and embodiments improves the speed and accuracy of the optical system 100, as well as reduces the overall weight of the system 100, when compared to conventional approaches.

Figure 2:
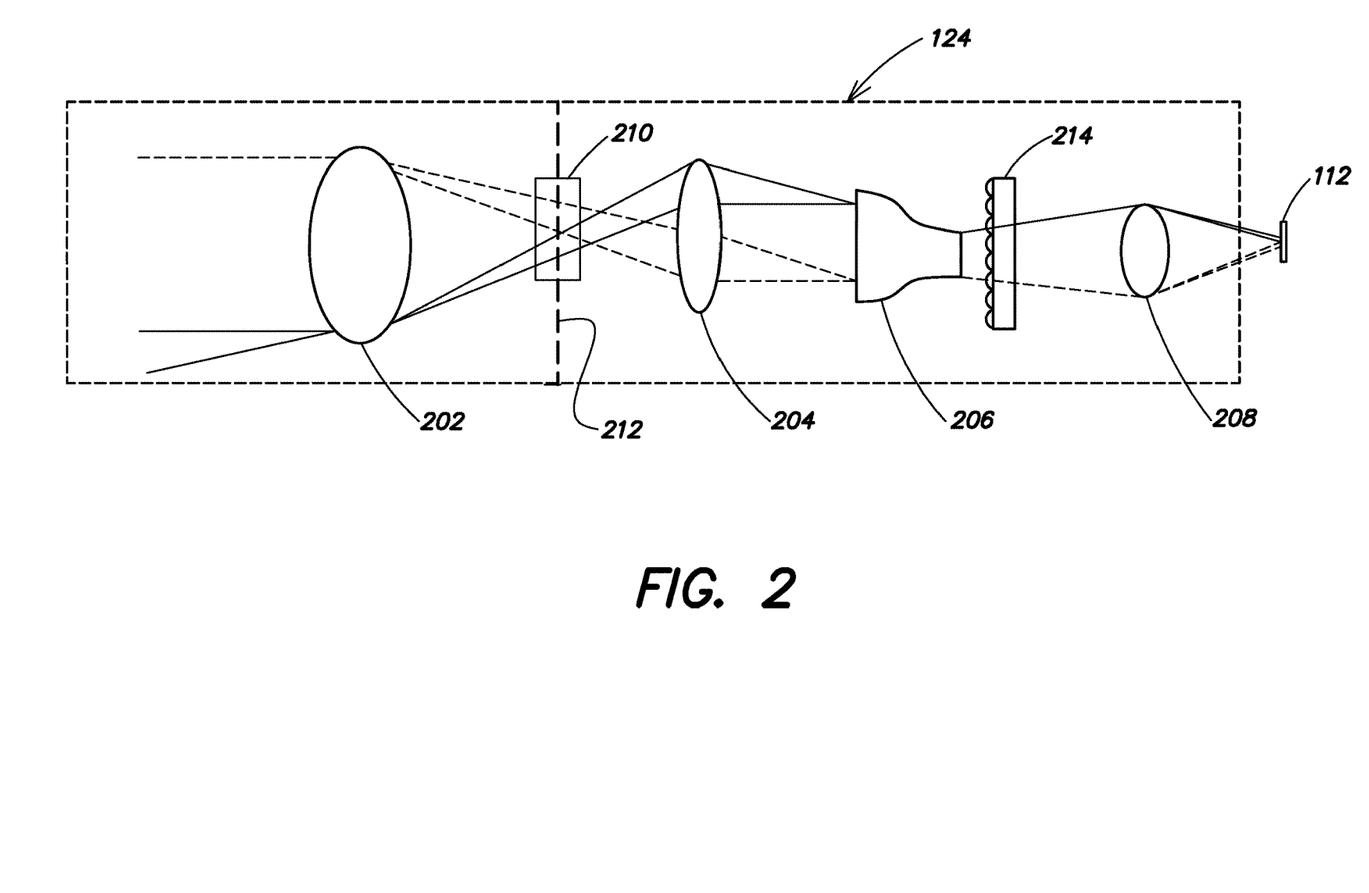
FIG. 2 is an example fused fiber focusing assembly of the example optical system shown in FIG. 1, according to aspects of the invention.

In various embodiments, the system 100 includes a fused fiber focusing assembly 124 positioned to receive reflections of the optical radiation from the area of the scene illuminated by the optical scanning subsystem 104. The fused fiber focusing assembly 124 collects the reflected optical radiation and directs the reflected optical radiation to the optical sensor 112 of the detection subsystem 102. FIG. 2 shows one example of the fused fiber focusing assembly 124 according to various implementations. FIG. 2 is described with continuing reference to the example optical system 100 shown in FIG. 1.

The fused fiber focusing assembly 124 may include a plurality of lenses coupled together and positioned to receive and focus the reflected optical radiation from the area of the scene illuminated by the optical scanning subsystem. As shown in the example, the plurality of lenses may receive and focus the reflected optical radiation directly onto a fused fiber bundle 206 of the fused fiber focusing assembly 124. In one example, the plurality of lenses includes a first lens 202 optically coupled to a second lens 204. The first lens 202 may include an objective lens, for example. As FIG. 2 further illustrates, the plurality of lenses may also include a second lens 204 positioned to receive the reflected optical radiation from the first lens 202, and focus the radiation directly on the fused fiber bundle 206.

In certain examples, the fused fiber focusing assembly 124 may include a micromirror device 210 positioned at a focal point of the objective lens 202 of the fused fiber focusing assembly 124, or another intermediate image in the fused fiber focusing assembly 124. That is, the micromirror device 210 may be positioned at a predetermined distance between the first lens 202 and the second lens 204 of the example fused fiber focusing assembly 124 shown in FIG. 2. For example, in FIG. 2 the micromirror device 210 is shown as positioned at an example focal point 212. The micromirror device 210 may include a plurality of microscopic mirrors the individual manipulation of which may act as a field stop of the fused fiber focusing assembly 124. That is, in certain examples the micromirror device 210 may limit the field angles of the reflected optical radiation received from the area of the scene illuminated.

Individual control of one or more of the microscopic mirrors of the micromirror device 210 may reduce noise in images detected by the optical system 100. In particular embodiments, the controller 116 may apply one or more control signals, such as a controlled voltage, to the micromirror device 210 to adjust a position of the one or more mirrors of the micromirror device 210. Adjustments of the micromirror device 210 performed by the controller 116 may include dynamic real-time adjustments to accommodate varying ambient conditions or application-specific conditions, and/or in certain embodiments, user-specified and/or predetermined adjustments to conform to one or more predetermined imaging applications.

Figure 3:
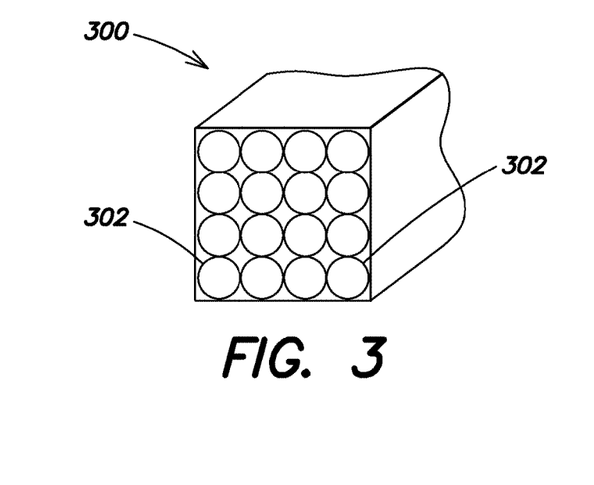
FIG. 3 is an example fused fiber bundle according to aspects of the invention.

In various embodiments, the fused fiber bundle 206 includes a plurality of optical fibers, such as non-imaging optical fibers, each bound together to form a single fused fiber bundle. Optical fibers of various implementations may be constructed from glass, or any other rigid or flexible suitable material. For example, individual optical fibers within the fused fiber bundle 206 may be constructed from an infrared transmitting plastic. Each optical fiber within the fused fiber bundle 206 may be coated in an anti-reflection coating to minimize noise and maximize transmissive efficiency. Within the fused fiber bundle 206, optical fibers may be arranged individually, or may be arranged in groups of optical fibers separated by one or more ordering elements, such as insulating spacers. Specifically, the optical fibers of the fused fiber bundle 206 may be arranged in one or more ordered patterns, such as a rectilinear arrangement. FIG. 3 shows one example of fused fiber bundle 300 having a plurality of optical fibers 302 arranged in a rectilinear pattern; however, in various other implementations other patterns of arrangement may be used.

Referring to FIG. 2, terminating ends of optical fibers at a receiving end of the fused fiber bundle 206 may be defined by a substantially planar flat surface. That is, the fused fiber bundle 206 may have a substantially planar receiving end at which each optical fiber of the fused fiber bundle 206 receives the reflected optical radiation from the plurality of lenses. In the example of FIG. 2, the fused fiber bundle 206 is shown receiving the reflected optical radiation from the second lens 204.

In certain embodiments, the fused fiber bundle 206 may include a fiber taper, and in one particular example, a cylindrical fiber taper. For example, FIG. 2 illustrates the fused fiber bundle 206 as a cylindrical fiber taper. The fiber taper may define a magnification ratio or de-magnification ratio to magnify or de-magnify the received optical radiation by a predetermined amount. Specifically, a ratio of the fiber taper diameters defines the magnification ratio for beam diameter and divergence. In a particular embodiment, ordered optical fibers of the fiber taper may minify received reflected optical radiation such that a spot size of the received optical radiation corresponds to one or more dimensions of the optical sensor 112. As discussed above, in various embodiments the fused fiber bundle 206 offers the advantage of improved weight and size when compared to various traditional receiving optics. Specifically, the fused fiber bundle 206 may replace traditionally larger and more cumbersome receiving optics as a result of the controlled illumination processes performed by various embodiments of the optical scanning subsystem 104.

For instance, in one example the fused fiber bundle 206 may define a 25 mm entrance face and an 8 mm exit face resulting in a magnification ratio of 0.32. Such an example would result in a highly diverging exit beam of 54°, for an input angle of 17.3°. The input angle of the fused fiber bundle 206 may be defined by the fiber acceptance angle of the fused fiber bundle 206, which in various examples is less than 17.3° relative to an axis of the fused fiber bundle 206. Accordingly, in various examples the first lens 202 and the second lens 204 limit the input angle of the received reflected optical radiation to 17.3° at the fused fiber bundle 206. Since the fused fiber bundle 206 accepts reflected optical radiation which is quickly diverging, in various examples the fused fiber bundle 206 has a high fill factor to maintain efficiency.

Once collected at the receiving end of the fused fiber bundle 206, the reflected optical radiation propagates along the length of the fused fiber bundle 206 to a transmitting end of the fused fiber bundle 206. At the transmitting end, the reflected optical radiation is directed by the fused fiber bundle 206 to a microlens array 214. As illustrated, the micro lens array 214 is interposed between the fused fiber bundle 206 and the focusing lens 208, and positioned so as to receive the reflected optical radiation from the fused fiber bundle 206. In various embodiments, the microlens array includes a plurality of small lenses (e.g., no more than a few millimeters in diameter) coupled to a supporting substrate. Each of the lenses may have a circular aperture and may be arranged such that adjacent lenses do not overlap. As a result of the minifying effect of the fused fiber bundle 206 of certain examples, the reflected optical radiation transmitted from the fused fiber bundle 206 may have a small diameter, but quickly diverge (e.g., at range of angles greater than 50 degrees). Accordingly, in such an example a high numerical aperture of the microlens array 214 enables collection of the reflected optical radiation from the fused fiber bundle 206 over a wide range of angles. In particular examples, the microlens array 214 may allow collection of reflected optical radiation over an angular range greater than the angular range of divergence of the fused fiber bundle 206 (e.g., an angular range greater than 50 degrees).

As FIG. 2 shows, in one implementation, the reflected optical radiation is directed by the microlens array 214 to a focusing lens 208 interposed between the optical sensor 112 and the microlens array 214. In such an example, the focusing lens 208 may include a simple lens positioned to focus the reflected optical radiation onto the one or more unit cells of the optical sensor 112. In certain examples, each optical fiber, or group of optical fibers, within the fused fiber bundle 206 may map to a particular unit cell of the optical sensor 112. For example, a first group of optical fibers within the fused fiber bundle 206 may direct reflected optical radiation to a first unit cell, a second group of optical fibers may map reflected optical radiation to a second unit cell, a third group of optical fibers may map reflected optical radiation to a third unit cell, and etc. In such an arrangement, when reflected optical radiation is received at the fused fiber bundle 206, less than all of the optical fibers within the fused fiber bundle 206 may receive that reflected optical radiation. That is, optical fibers within the fused fiber bundle 206 corresponding to the area of the scene illuminated by the optical scanning subsystem may receive the reflected optical radiation, and optical fibers corresponding to areas of the scene outside of the illuminated area may not.

While shown in FIG. 1 as coupled to an optical scanning subsystem including an optical source (e.g., optical source 108) and a waveguide (e.g., waveguide 110) which may be operated to directly illuminate an area of the scene, in various embodiments, the fused fiber focusing assembly 124 may also permit collection of optical radiation responsive to flash illumination of the scene. In one example, the optical source 108 may include a flash illumination source that provides a brief "flash" of radiation to illuminate the scene. This may include a 1 ms-30 ms flash of a continuous beam. In the example where the optical source 108 provides a pulsed beam having a short pulse length (e.g., 10 ns-100 ns), "flash" illumination may include increasing the repetition rate of the optical source. During the flash illumination operations, an entire span, or a specific area, of the scene may be briefly illuminated. Reflections of the flash illumination may be received at the fused fiber focusing assembly and focused on the optical sensor 112. While non-mechanical active beamsteering may be particularly advantageous in certain applications and conditions, in certain other situations, the system 100 may include components for flash illumination processes.

Returning to FIG. 1, the system 100 may include an optical detector, which in certain examples includes the optical sensor 112. The optical sensor 112 of the detection subsystem 102 includes a plurality of individual detector elements, which may be referred to as unit cells or pixels. For example, in one implementation the optical sensor 112 may include a focal plane array (FPA) having a plurality of unit cells arranged in a series of rows and columns. However, in certain other examples the optical sensor 112 may have a reduced size compared to a typical FPA. For example, the optical sensor 112 may include a reduced number of unit cells, where the number of unit cells determines the resolution of the system 100. For example, the optical sensor 112 may include a single linear array of unit cells, or a single unit cell.

When activated, each unit cell of the optical sensor 112 is designed to collect and integrate photons of light impinging on that respective unit cell. A circuit within each unit cell of the optical sensor 112 accumulates charge corresponding to the flux of incident optical radiation during the integration period. In one implementation, each unit cell of the optical sensor 112 may include a complementary metal-oxide semiconductor (CMOS) sensor or a charge coupled device (CCD). In some embodiments, charge-injection devices (CIDs) may also be used for unit cells.

In various embodiments, the ROIC 114 is in optical and electrical communication with the optical sensor 112, and in particular, each unit cell of the optical sensor 112. The ROIC 114 is configured to activate each unit cell of the optical sensor 112 during the integration period. In particular, the ROIC 114 of various embodiments is configured to activate unit cells of the optical sensor 112 to collect reflections of the optical radiation reflected from the area of the scene illuminated by the optical scanning subsystem 104. Activation of unit cells of the optical sensor 112, and control of the optical sensor 112, is further discussed below with reference to FIG. 4.

While discussed herein in one example as including a two-dimensional arrangement of unit cells in one or more rows or columns, in various embodiments of the optical sensor 112 shown in FIG. 1 may include unit cells arranged in any suitable pattern. In particular implementations, the optical sensor 112 may include a single linear of array of unit cells. For example, the single linear array of unit cells may include a single row or single column of unit cells. However, in certain other examples the optical sensor 112 may include a few rows or columns (e.g., less than ten) to accommodate a height of the image orthogonal to a dimension of the beam width. The width of the beam of optical radiation steered by the waveguide 110 may correspond to the dimensions of the optical sensor 112, such as the dimensions of the single row or column of unit cells. Furthermore, the speed of any given scan (or flash) performed by the optical scanning subsystem 104 may be controlled relative to the width of the beam of optical radiation, and the dimensions of the optical sensor 112. For example, small optical beam widths may require faster scanning relative to large beam widths.

"Row" and "column" as used herein, may be interchanged according to various embodiments. That is, although "row" may generally be used to refer to a horizontal positioning (i.e., an x-direction in a Cartesian coordinate system) and "column" may generally be used to refer to a vertical positioning (i.e., a y-direction in a Cartesian coordinate system), as used herein either may be used to refer to a horizontal positioning and a vertical positioning relative to the other.

In various embodiments, the optical scanning subsystem 104, and in particular, the waveguide 110 is configured to direct optical radiation over an area of the scene that corresponds to the activated unit cells of the optical sensor 112. In one embodiment, the ROIC 114 is configured to activate one or more unit cells of the optical sensor 112 responsive to direction of the optical radiation by the waveguide 110. For example, the controller 116 may generate a synchronization signal, and transmit the synchronization signal to the optical scanning subsystem 104 and the ROIC 114. In certain embodiments, the synchronization signal received by one, or both, of the ROIC 114 and optical scanning subsystem 104 corresponds to a frame rate of the detection subsystem 102. The frame rate of the detection subsystem 102 refers to the snapshot operation of each individual unit cell of the optical sensor 112, and the frequency at which the optical system 100 generates consecutive images (i.e., frames). The synchronization signal received by one, or both, of the ROIC 114 and optical scanning subsystem 104 may be triggered by frame rate to align the optical scanning subsystem 104 with the detection subsystem 102. That is, in certain embodiments a synchronization signal may be generated at the beginning of a frame interval of a given frame.

After the expiration of the integration period, the ROIC 114 is configured to deactivate each unit cell of the optical sensor 112 and read out a value for each deactivated unit cell. Each read out value may be transmitted to other components of the optical system 100 and used to construct an image of the illuminated area of the scene, and/or view (e.g., track) one or more objects within the scene. In certain embodiments, the integration period may be about the same as the frame interval of a frame of the detection subsystem 102. In particular, the duration of the integration period and the duration of time it takes to read-out the unit cells of the optical sensor 112, may be substantially equal to the duration of one frame of operation. Such an embodiment may be advantageous in low flux conditions where unit cells may be activated for a longer duration. However, in various other embodiments, the integration period may be substantially less than the frame interval of a frame of operation of the detection subsystem 102. Such an embodiment may be advantageous when flux conditions are high. In such an embodiment, the ROIC 114 may activate the unit cells of the optical sensor 112 during a fraction of the frame interval, and the unit cells of the optical sensor 112 may be configured to hold the stored charge for the remainder of the frame interval.

In various embodiments, the adaptive polymer lens assembly 106 is configured to adjust a magnification of the optical scanning subsystem 104. While illustrated in FIG. 1 as separate from the optical scanning subsystem 104, in certain examples, the adaptive polymer lens assembly 106 may be positioned within the optical scanning subsystem 104. While shown in FIG. 1 as including a single adaptive polymer lens, in various embodiments the adaptive polymer lens assembly 106 may also include more than one lens. Responsive to receiving one or more commands from the controller 116, the adaptive polymer lens assembly 106 may be configured to rapidly and automatically adjust the magnification of the optical scanning subsystem 104. In various embodiments, the adaptive polymer lens assembly 106 includes a lens fabricated from a flexible membrane, the curvature of which can be rapidly modified to adjust the optical magnification of the adaptive polymer lens assembly 106. The flexible lens may be supported by one or more support structures, such as support rings, which apply a constant pressure to the flexible lens.

In various embodiments the optical magnification of the adaptive polymer lens assembly 106 is adjusted by applying a linear compression to the flexible membrane to change a radius of curvature of the flexible membrane. In particular, the adaptive polymer lens assembly 106 may include a first flexible membrane and a second flexible membrane having a fluid dispersed in-between. The linear pressure from the support structures changes the fluid pressure within the core of the adaptive polymer lens assembly 106 (i.e., between the first support structure and the second support structure), which changes the curvature of the adaptive polymer lens assembly 106. In various embodiments, the adaptive polymer lens assembly 106 is in electrical communication with the controller 116 and adapted to adjust the magnification of the optical system responsive to receiving one or more commands from the controller 116. Such embodiments permit active control of beam divergence from the optical source 108 of various embodiments. Since active control of the beam divergence via the adaptive polymer lens assembly 106 may have an effect on the speed of the waveguide 110, in various examples the controller 106 may coordinate active control of the adaptive polymer lens assembly 106 with the scanning operations performed by the waveguide.

As discussed above, the optical radiation transmitted from the adaptive polymer lens assembly 106 may include a "fan" beam or a "spot" beam directed by the waveguide 110. Accordingly, in some embodiments the adaptive polymer lens assembly 106 may control the divergence of the optical radiation, and in other embodiments it may simply expand or reduce the optical radiation. For example, the adaptive polymer lens assembly 106 may change in shape according to a Powell lens configured to provide a "fan" beam. In other examples, the adaptive polymer lens assembly 106 may reconfigure a fan beam to a spot beam or reconfigure a spot beam to a fan beam.

In an embodiment where the optical radiation includes a "fan" beam provided by the waveguide 110, the optical scanning subsystem 104 may be configured to direct the optical radiation in a single linear direction based on a frame interval of the frame rate of the system 100. For example, the waveguide 110 may be configured to control a width of beam divergence of the optical radiation along a first axis (e.g., in a vertical direction relative to the scene to be imaged), and the adaptive polymer lens assembly 106 may be configured to control a width of beam divergence of the optical radiation along a second axis (e.g., in a horizontal direction relative to the scene), substantially perpendicular to the first axis. In contrast, in an embodiment where the optical radiation includes a "spot" beam, the optical scanning subsystem 104 may illuminate the portion of the scene to be imaged in a two-dimensional pattern.

Referring again to FIG. 1, in various embodiments the optical system 100 may include a controller 116 coupled and in electrical communication with the adaptive polymer lens assembly 106, components of the optical scanning subsystem 104, and components of the detection subsystem 102. For example, the controller 116 may be in electrical communication with the ROIC 114, the optical source 108, and the waveguide 110, of various embodiments. The controller 116 may include a single controller; however, in various other embodiments the controller 116 may consist of a plurality of controllers and/or control circuitry. In particular, the controller 116 may include a plurality of components such as a waveguide generator coupled to a waveguide controller.

While the controller 116 is illustrated separate from the one or more components of the optical system 100, in various embodiments, the controller 116 may be combined with the one or more other components of the optical system 100, such as the ROIC 114. For instance, the controller 116, ROIC 114, and other combined components of the optical system 100 may include a combination of software-configured elements, control circuitry, signal processing circuitry, application specific integrated circuitry, radio-frequency integrated circuitry, or any combination of various hardware and logic circuitry for performing the various processes discussed herein. For instance, the controller 116 of various embodiments may include a processor core, memory, and programmable input/output components. The controller 116 may be configured to automatically and/or dynamically control various components of the optical system 100, such as the adaptive polymer lens assembly 106 or the waveguide 110.

In particular, in various embodiments an input/output component of the controller 116, such as a user interface, is configured to receive an input specifying an area of the scene to be imaged. For instance, the user interface may accept information from an external input source, such as a button, switch, keyboard, trackball, joystick, touch screen, mouse device, or any other suitable external input device. In various embodiments, responsive to receiving the user input, the controller 116 is configured to dynamically adjust a control signal applied to the waveguide 110 to adjust the area of the scene illuminated. In at least one embodiment, the controller 116 may be further configured to automatically and/or dynamically control the adaptive polymer lens assembly 106 expand the FOV of the detection subsystem 102 from a first FOV to a second FOV to include the specified area of the scene.

Figure 4:
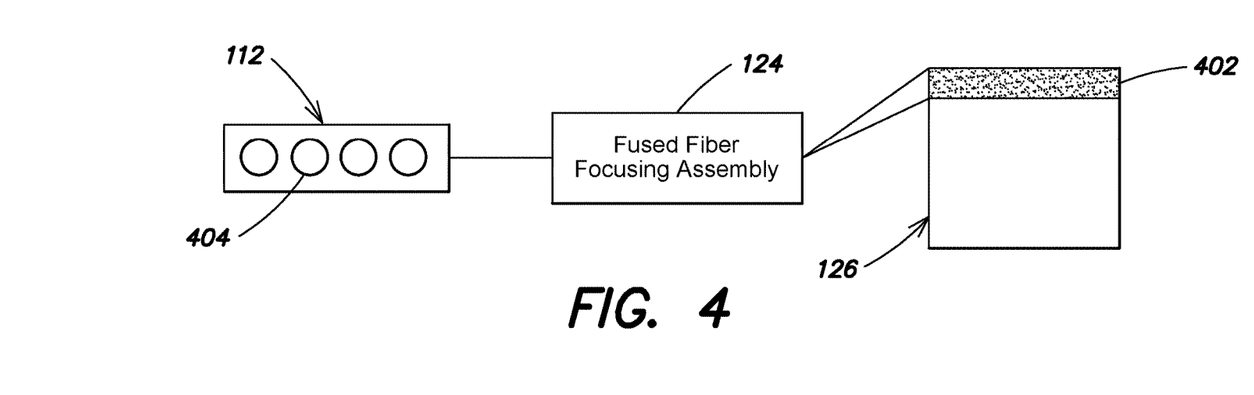
FIG. 4 is an example illustration of optical radiation received at the optical sensor of the optical system illustrated in FIG. 1, according to aspects of the invention.

As discussed with reference to at least FIG. 1, in certain examples the optical sensor may include a reduced number of unit cells (e.g., less than a full FPA). One such example is illustrated in FIG. 4. In particular, FIG. 4 is an example illustration of optical radiation reflected from an area of the scene 402 and received at the optical sensor 112. In the illustrated example, the optical sensor 112 is shown as including a single linear array of unit cells 404. Such an arrangement may be particularly advantageous when the optical radiation is directed by the waveguide 110 in one or more fan beams (e.g., fan beam). FIG. 4 is described with continuing reference to the optical system 100 illustrated in FIG. 1.

In certain examples, the controller 116 may be coupled to the detection subsystem 102 and may be configured to generate one or more images of the scene based on one or more consecutive scans performed by the waveguide 110. In the illustrated example of FIG. 4, the waveguide 110 may direct the optical radiation generated by the optical source in a first fan beam (e.g., fan beam 402) over a first area of the scene. Subsequently, the waveguide 110 may direct the optical radiation generated by the optical source in a second fan beam (not illustrated) over a second area of the scene. In such an example, the second area of the scene is a different from the first area of the scene. Based on the received reflections corresponding to the optical radiation scanned over the first area of the scene and the second area of the scene, the controller 116 may generate a two-dimensional image of the scene. For example, the controller 116 may execute one or more image construction algorithms to piece-together consecutive scans of the areas of the scene 216.

In certain other examples, the optical sensor 112 may include only a single unit cell, such as one of the unit cells 404 illustrated in FIG. 4. Such an implementation may be particularly beneficial when the optical radiation is directed by the waveguide 110 in one or more spot beams. To achieve a spot beam, and/or reconfigure between a spot beam and a fan beam, the waveguide 110 may be configured to control a width of beam divergence of the optical radiation along a first axis (e.g., in a vertical direction relative to the scene to be imaged), and the adaptive polymer lens assembly 106 may configured to control a width of beam divergence of the optical radiation along a second axis (e.g., in a horizontal direction relative to the scene to be imaged), substantially perpendicular to the first axis. As discussed herein, the spot beam may include a beam of optical radiation having a concentrated area of substantially uniform shape. In particular, the uniform shape may correspond to the dimensions of the single unit cell of the optical sensor 112 of one implementation. One or more scans of the spot beam over different areas of the scene may be sequentially collected at the optical sensor 112 to piece-together an image of the scene using a suitable image construction algorithm, or detect the presence or absence of an object within the scene.

In certain other examples, the detection subsystem 102 and the optical scanning subsystem 104 may be configured to operate in a target tracking mode of operation. In such an embodiment, the waveguide may illuminate an area of a scene that corresponds to a desired target. For instance, the target may include an object within the scene (e.g., a vehicle). In certain examples, the tracking mode of operation may be initiated by receipt of an input (e.g., user input) identifying an intended target within the scene. Instead of constructing a full image of the scene from a series of consecutive scans, as discussed above, during the tracking mode of operation the controller 116 may sample the received reflections of the optical radiation to detect the presence, or absence, of the target within the area of the scene illuminated. Such an implementation may allow a user to track an object within the scene, without the need to generate a full image of the scene. In addition to the various arrangements discussed herein, such a mode of operation may further reduce the power consumption of the system 100 when compared to typical imaging approaches.

Figure 5:
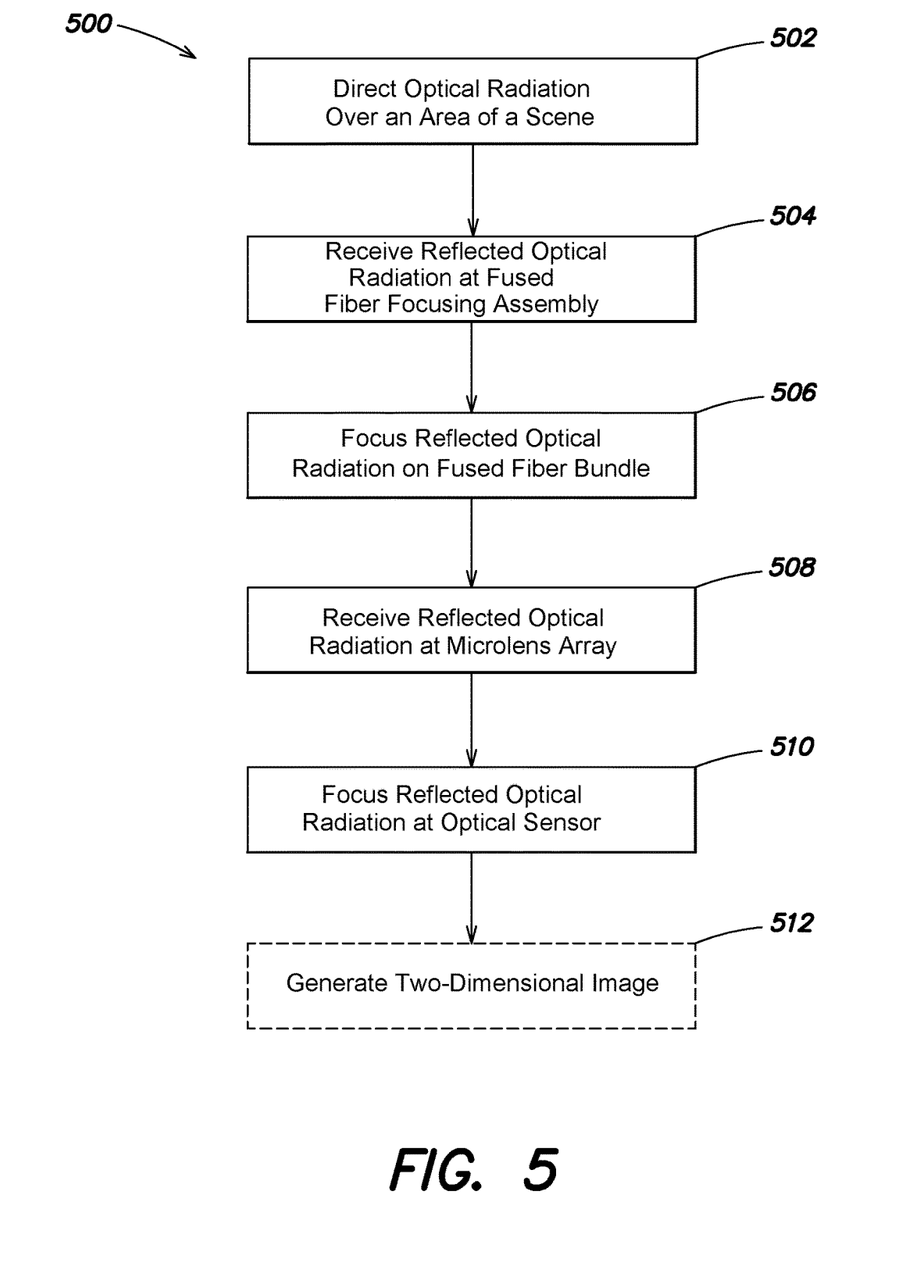
FIG. 5 is an example process flow according to aspects of the invention.

As described above with reference to FIGS. 1-4, several embodiments perform processes that improve known schemes for imaging. In some embodiments, these processes are executed by an imaging system, such as the optical system 100 described above with reference to at least FIG. 1. One example of such a process is illustrated in FIG. 5. According to this example, the process 500 may include the acts of directing optical radiation at an area of a scene, receiving a reflection of the optical radiation at a fused fiber focusing assembly, focusing the reflected optical radiation directly onto a fused fiber bundle, receiving the reflected optical radiation at a microlens array, and focusing the reflected optical radiation onto an optical sensor. In various embodiments, the process 500 may further include generating a two-dimensional image of the scene based at least in part on the reflected optical radiation.

In various embodiments, the optical system 100 described with reference to at least FIG. 1 begins the process 500 at an initial condition. For instance, the initial condition may include an initial field of view at an initial area of a scene to be imaged. Such initial conditions serve as a starting point for the acts discussed below. It is appreciated that in certain embodiments acts 502-510 may be performed in the order discussed below. However, in various other embodiments, acts 502-510 may be performed in any other suitable order, and each act may be performed for any suitable number of iterations.

In various embodiments, the process 500 includes generating optical radiation at an optical source, which may include emitting shortwave (SWIR) infrared radiation in a wavelength range of approximately 0.9-1.7 micrometers. Responsive to generating the optical radiation, the process 500 includes directing the optical radiation generated by the optical source over an area of the scene to illuminate that area of the scene (act 502). In various embodiments, responsive to receiving optical radiation generated by the optical source, a waveguide is controlled to direct the optical radiation over the area of the scene, as discussed with reference to the waveguide 110 illustrated in FIG. 1. Accordingly, act 502 may include directing the optical radiation over a section of the scene that is less than the entire span of the scene.

For example, in act 502 the process 500 may include directing the optical radiation over the area of the scene in a first fan beam. The process 500 may also include directing the optical radiation over another area of the scene in one or more subsequent fan beam scans. In certain other examples, in act 502 the process 500 may include directing the optical radiation over the area of the scene in one or more spot beams, or any combination of spot and fan beams. As discussed above with reference to FIG. 1, controlling the waveguide to direct the optical radiation over the area of the scene may include applying a control voltage to the waveguide to adjust a refractive index of the waveguide and adjust the beamsteering of the optical radiation. Such a control voltage may be provided by the controller 116 of FIG. 1, or hard-wired circuitry.

In act 504, the process 500 may include receiving reflection(s) of the optical radiation from the area of the scene at a fused fiber focusing assembly, such as the fused fiber focusing assembly 124 shown in at least FIG. 1. Specifically, the process 500 may include receiving reflected optical radiation from the area of the scene at one or more of a plurality of lenses of the fused fiber focusing assembly. As discussed above with reference to at least the example fused fiber focusing assembly 124 shown in FIG. 2, in various embodiments the fused fiber focusing assembly may include a first lens and a second lens. Accordingly, in at least one embodiment, act 504 may include receiving the reflected optical radiation at the first lens and transmitting the reflected optical radiation from the first lens to the second lens.

In certain embodiments, the process 500 may further include adjusting one or more mirrors of a micromirror device interposed between the first lens and the second lens, and positioned at a focal point of the imaging system. In particular, individual control of one or more of the microscopic mirrors of the micromirror device may reduce noise in images produced by the optical system. For example, the process 500 may include limiting a field angle of the reflected optical radiation received from the first area of the scene at the micromirror device. Accordingly, in such embodiments the process 500 may include applying one or more control signals (e.g., from the controller 116 of FIG. 1), such as a controlled voltage, to the micromirror device to adjust a position of the one or more mirrors of the micromirror device.

As further discussed above with reference to at least FIG. 2, in various embodiments the fused fiber bundle includes a plurality of optical fibers, bound together to form a single fused fiber bundle. In response to receiving the reflected optical radiation at the second lens of the plurality of lenses, the process 500 may include focusing the reflected optical radiation from the first area of the scene directly onto the fused fiber bundle (act 506). Once received at the fused fiber bundle, the process 500 may further include propagating the reflected optical radiation along a length of the fused fiber bundle, and in particular, along a length of the one or more optical fibers of the fused fiber bundle. That is, in various embodiments the process 500 may include receiving the reflected optical radiation from the second lens at the receiving end of the fused fiber bundle, and propagating the reflected optical radiation along the fused fiber bundle in a direction of a transmitting end.

In one example, the fused fiber bundle may include a fiber taper which defines a magnification ratio or a de-magnification ratio. In such an embodiment, the process 500 may also include magnifying or de-magnifying the reflected optical radiation during propagation along the length of the fused fiber bundle. Once the reflected optical radiation arrives at the transmitting end of the fused fiber bundle, the process 500 may further include directing the reflected optical radiation from the fused fiber bundle to a microlens array (act 508). In particular examples, the microlens array is defined by a large numerical aperture, which allows collection of reflected optical radiation over an angular range greater than the angular range of divergence from the fused fiber bundle 206 (e.g., an angular range greater than 50 degrees). In certain examples, the process 500 may further include receiving the reflected optical radiation from the microlens array at a focusing lens, and focusing the reflected optical radiation onto the optical sensor act 510).

In certain examples, the process 500 may include receiving the reflected optical radiation at the active portion of the optical sensor, and in particular, one or more active unit cells of the optical sensor. As discussed above with reference to at least FIG. 1, each active unit cell may collect and integrate the received photons of light during an integration period. After the expiration of the integration period, the process 500 may include deactivating each unit cell of the selected pattern and reading out a value for each deactivated unit cell. Each read out value may be transmitted to other components of the optical system and used to construct an image of the observed scene (act 512).

As discussed above with reference to FIG. 1, in various embodiments the optical sensor may include a two-dimensional array of unit cells arranged in one or more rows or columns. However, in certain other examples the optical sensor may include a reduced number of unit cells, such as a single linear array of unit cells or a single unit cell. Such an arrangement may correspond to one or more fan beams or spot beams directed by the waveguide over one or more areas of the scene. In particular, the waveguide may control the beamsteering of the optical radiation such that a fan beam or spot beam is defined by a shape substantially corresponding to the dimensions of the linear array of unit cells. In such an embodiment, the process 500 may include one or more acts of generating an image from the received optical radiation reflected from the areas of the scene illuminated (act 510). For example, the process 500 may include the act of generating a two-dimensional image of the scene based at least in part on the reflected optical radiation from a first area of the scene and the reflected optical radiation from a second area of the scene. Such embodiments may include constructing an image of the scene (or a section of the scene), using one or more image construction algorithms based on one or more read-out values provided by the optical sensor.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An active solid-state imaging system comprising:
an optical scanning subsystem including an optical source and a beamsteering device, the optical source being configured to generate a beam of optical radiation, and the beamsteering device including a solid-state liquid crystal waveguide configured to receive the beam of the optical radiation from the optical source, to direct the beam of optical radiation to illuminate a portion of a scene, and to steer the beam of optical radiation over a first area of the scene and over a scan range of 30° by 5°;
a detection subsystem including an optical sensor configured to collect reflected optical radiation from the first area of the scene, the optical sensor including a single linear array of unit cells, the solid-state liquid crystal waveguide being configured to illuminate the portion of the scene within a field of view of the detection subsystem such that an illuminated area of the scene is less than the field of view of the detection subsystem; and
a fused fiber focusing assembly including:
a fused fiber bundle of a plurality of ordered optical fibers arranged in a rectilinear pattern,
a plurality of lenses, the plurality of lenses being coupled together and positioned to receive and focus the reflected optical radiation from the first area of the scene directly onto the fused fiber bundle,
a microlens array interposed between the fused fiber bundle and the optical sensor and positioned to receive the reflected optical radiation from the fused fiber bundle, the microlens array being configured to collect the reflected optical radiation over an angular range greater than an angular range of divergence of the fused fiber bundle, and
a focusing lens interposed between the microlens array and the optical sensor and configured to focus the reflected optical radiation from the microlens array onto the single linear array of unit cells.

2. The imaging system according to claim 1, wherein the plurality of ordered optical fibers form a cylindrical fiber taper.

3. The imaging system according to claim 2 wherein the cylindrical fiber taper is constructed to define a magnification ratio such that a spot size of the reflected optical radiation corresponds to a dimension of the optical sensor.

4. The imaging system according to claim 1, wherein the plurality of lenses includes a first lens and a second lens positioned such that the first lens receives the reflected optical radiation from the first area of the scene and directs the reflected optical radiation to the second lens, and wherein the fused fiber focusing assembly further includes a micromirror device positioned between the first lens and the second lens of the plurality of lenses, and at a focal point of the first lens.

5. The imaging system according to claim 1, wherein the solid-state liquid crystal waveguide is further configured to steer the beam of optical radiation generated by the optical source in a first fan beam over the first area of the scene and in a second fan beam over a second area of the scene, the second area of the scene being different from the first area of the scene.

6. The imaging system according to claim 5, further comprising a controller coupled to the detection subsystem and the optical scanning subsystem, wherein the controller is configured to generate a two-dimensional image of the scene based at least in part on the reflected optical radiation from the first area of the scene and reflected optical radiation from the second area of the scene.

7. The imaging system according to claim 1, wherein the waveguide is further configured to steer the beam of optical radiation generated by the optical source in a spot beam over the first area of the scene.

8. The imaging system according to claim 1, wherein the optical source includes an active shortwave (SWIR) infrared laser configured to emit SWIR radiation in a wavelength range of approximately 0.9-1.7 micrometers.

9. The imaging system according to claim 8, wherein the plurality of ordered optical fibers are constructed from an infrared transmitting plastic.

10. The imaging system according to claim 1, wherein the fused fiber focusing assembly further includes a micromirror device positioned at an intermediate image formed by the plurality of lenses.

11. The imaging system according to claim 10, wherein the micromirror device includes a plurality of micromirror elements, and further comprising a controller coupled to the micromirror device and configured to apply a control signal to the micromirror device to adjust a position of at least one micromirror element.

12. The imaging system according to claim 1, wherein the microlens array includes a plurality of microlenses each having a circular aperture and arranged such that adjacent microlenses do not overlap.

13. The imaging system according to claim 12, wherein the microlens array further includes a supporting substrate, the plurality of microlenses being coupled to the supporting substrate.

14. The imaging system according to claim 1, further comprising an adaptive polymer lens assembly configured to adjust a magnification of the optical scanning subsystem.

15. A method of optical imaging, the method comprising:
illuminating, using a solid-state liquid crystal waveguide, a portion of a scene within a field of view of an optical sensor with a beam of optical radiation generated by an optical source of an optical scanning subsystem to produce an illuminated area that is smaller than the field of view of the optical sensor;
steering the beam of optical radiation over a first area of the scene and over a scan range of of 30° by 5° using the solid-state liquid crystal waveguide;
receiving reflected optical radiation from the first area of the scene at a first lens of a plurality of lenses of a fused fiber focusing assembly;
focusing the reflected optical radiation from the first area of the scene, by the plurality of lenses, directly onto a fused fiber bundle;
propagating the reflected optical radiation along a length of a plurality of ordered optical fibers of the fused fiber bundle responsive to focusing the reflected optical radiation directly onto the fused fiber bundle, the plurality of ordered optical fibers of the fused fiber bundle being arranged in a rectilinear pattern;
receiving the reflected optical radiation from the fused fiber bundle at a microlens array;
collecting the reflected optical radiation with the microlens array over an angular range greater than an angular range of divergence of the fused fiber bundle; and focusing the reflected optical radiation from the microlens array onto a single linear array of unit cells of the optical sensor using a focusing lens.

16. The method according to claim 15, further comprising limiting a field angle of the reflected optical radiation received from the first area of the scene at a micromirror device positioned at a focal point of the first lens.

17. The method according to claim 15, wherein steering the optical radiation over the first area of the scene includes steering the optical radiation in a first fan beam.

18. The method according to claim 17, further comprising:
   steering the optical radiation generated by the optical source in a second fan beam over a second area of the scene, the second area of the scene being different from the first area of the scene; and
   generating a two-dimensional image of the scene based at least in part on the reflected optical radiation from the first area of the scene and reflected optical radiation from the second area of the scene.

19. The method according to claim 15, wherein steering the optical radiation over the first area of the scene includes steering the optical radiation in a first spot beam.

20. The method according to claim 15, further comprising generating the optical radiation at the optical source, wherein generating the optical radiation includes emitting shortwave (SWIR) infrared radiation in a wavelength range of approximately 0.9-1.7 micrometers.

* * * * *